UNITED STATES PATENT OFFICE.

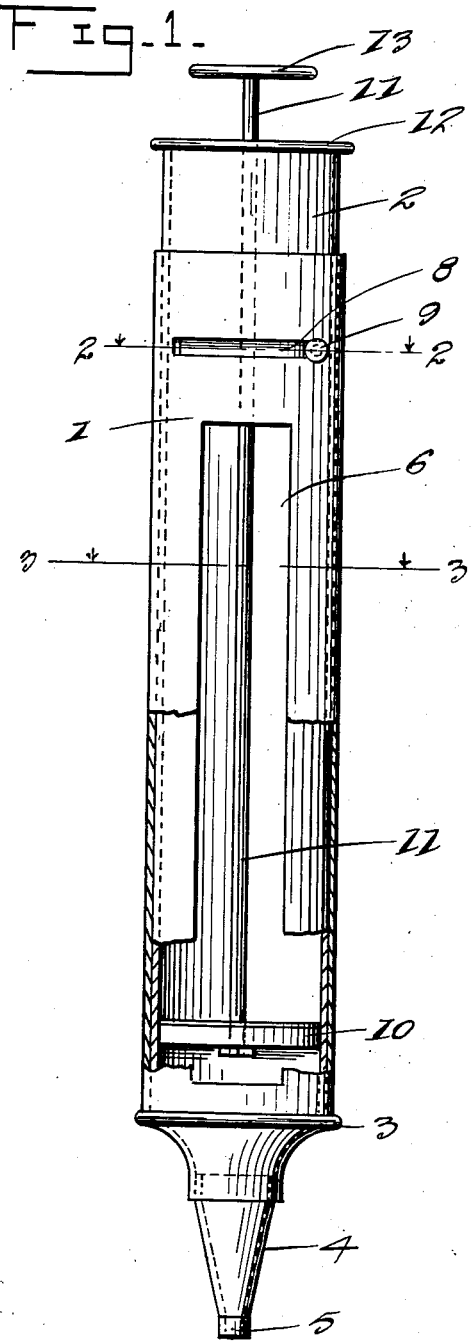

ALFRED E. TOOMEY, OF EDMORE, NORTH DAKOTA.

GREASE AND OIL GUN.

1,219,197. Specification of Letters Patent. Patented Mar. 13, 1917.

Application filed May 19, 1914. Serial No. 839,560.

*To all whom it may concern:*

Be it known that I, ALFRED E. TOOMEY, a citizen of the United States, residing at Edmore, in the county of Ramsey and State of North Dakota, have invented certain new and useful Improvements in Grease and Oil Guns, of which the following is a specification.

This invention relates to grease guns, and more particularly for use in lubricating automobiles, but capable of many other uses, and one of the principal objects of the invention is to provide a device of simple construction which will reliably and efficiently force grease into the bearings or at remote places.

Another object of the invention is to provide a grease gun which can be quickly opened at the side for receiving the grease and which when closed will form a practically air tight inclosure for the grease and a plunger being fitted into the gun for forcing the grease out through a nozzle, said nozzle being preferably detachable from the gun and provided with means whereby a hose or tube may be connected thereto.

Still another object of the invention is to provide a grease gun of simple construction composed of two parts, which can be manufactured at low cost, and which will be reliable and efficient for its purpose.

These and other objects may be attained by means of the construction illustrated in the accompanying drawings, in which, Figure 1 is a side elevation and partial section of a grease gun made in accordance with this invention, Fig. 2 is a sectional view taken on the line 2—2 of Fig. 1 looking in the direction indicated by the arrows, Fig. 3 is a similar section taken upon the line 3—3 of Fig. 1, looking in the direction indicated by the arrows, and Fig. 4 is a sectional view showing the opening for admitting the grease or oil closed by the relative rotations of the inner and outer tubes.

Referring to the drawing, the numeral 1 designates the outer tube or casing, and 2 is the inner tube or casing, the latter being mounted within the outer casing 1 to fit nicely therein and to permit rotation of one casing relatively to the other. The inner casing 2 extends above the outer casing 1, as shown more clearly in Fig. 1, and the lower ends of said casings are coextensive and fitted thereto is a nozzle member 3 provided with a detachable nozzle 4 the outer end 5 of which may be provided with means for connecting a tube thereto to lead the supply of grease off at any required distance to reach inaccessible places. The inner and outer casings are both provided with coincident openings 6 and 7, and the outer tube is provided with a slot 8, and the inner tube 2 is provided with a stud or button 9 extending through the slot 8 and adapted to be moved in said slot to rotate the two tubes relatively to close the opening 7.

A plunger head 10 is connected to a rod 11 extending through a detachable cap or diaphragm 12 fitted to the inner tube 2. The rod 11 is provided with a detachable disk or pusher 13.

From the foregoing it will be obvious that when the openings 6 and 7 are disposed coincidently, as shown in Figs. 1 and 3, the grease or lubricant may be readily placed within the inner tube by means of a paddle or similar tool and after the inner tube has been rotated relatively to the outer tube, the grease will be confined within the casing and by operating the plunger, the grease may be discharged as will be understood.

Various changes may be made in the details of construction without departing from the spirit and scope of the invention as defined in the claims.

What is claimed is:—

1. A grease gun comprising inner and outer casings, each provided with coincident openings, the inner casing extending beyond the outer casing, means whereby said casings may be relatively rotated to bring the openings into coincidence and to close the openings, a detachable nozzle connected to one end of the outer casing, and a plunger mounted in the inner casing for discharging the contents thereof out through said nozzle.

2. A grease gun comprising an outer cylindrical casing having its inner end fully open and having a slot in its side wall, a nozzle secured to the outer end of the outer casing, an inner cylindrical casing mounted in the outer casing and having its inner end fully open, said inner casing having a slot in its side wall and having its outer end projecting beyond the inner end of the outer casing, a closure for the outer end of the inner casing, a plunger mounted in the inner casing, a rod secured to the plunger and passing through the closure and means for limiting the rotary movement of the casings relatively one to the other and for preventing endwise movement of the casings relatively.

3. A grease gun comprising an outer casing having a discharge nozzle connected thereto, said casing being open at its inner end, an inner casing open at its outer end and having a closure at its inner end, a plunger mounted in the inner casing, said casings having longitudinal openings in their side walls, and said casings being mounted to rotate one relatively to the other, and means for limiting the rotative movement of the casings to bring the openings into coincidence and to limit the closing movement of said casings one relatively to the other.

In testimony whereof I affix my signature in presence of two witnesses.

ALFRED E. TOOMEY.

Witnesses:
JOHN BERG,
T. W. MORRISSEY.